United States Patent
Sato

(10) Patent No.: US 12,265,049 B2
(45) Date of Patent: Apr. 1, 2025

(54) MANUFACTURING METHOD FOR ELECTROCHEMICAL SENSOR, AND ELECTROCHEMICAL SENSOR

(71) Applicant: ARKRAY, Inc., Kyoto (JP)

(72) Inventor: Yoshiharu Sato, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 782 days.

(21) Appl. No.: 17/243,884

(22) Filed: Apr. 29, 2021

(65) Prior Publication Data

US 2021/0341410 A1    Nov. 4, 2021

(30) Foreign Application Priority Data

May 1, 2020  (JP) ................................ 2020-081128

(51) Int. Cl.
*G01N 27/327* (2006.01)
*G01N 27/30* (2006.01)

(52) U.S. Cl.
CPC ....... *G01N 27/3273* (2013.01); *G01N 27/301* (2013.01)

(58) Field of Classification Search
CPC .......................... G01N 27/3273; G01N 27/301
USPC ...................................................... 427/97.3
See application file for complete search history.

(56) References Cited

U.S. PATENT DOCUMENTS

| 2010/0176767 | A1* | 7/2010 | Long | H01M 4/583 |
| | | | | 427/126.6 |
| 2014/0326037 | A1* | 11/2014 | Fukuda | G01N 27/3274 |
| | | | | 73/1.73 |
| 2016/0087283 | A1* | 3/2016 | Sumioka | H01M 8/0234 |
| | | | | 264/129 |
| 2017/0324119 | A1* | 11/2017 | Powell, Jr. | C25B 9/19 |
| 2019/0139715 | A1* | 5/2019 | Lee | G01N 27/308 |
| 2019/0316996 | A1* | 10/2019 | Li | B01J 20/3057 |

FOREIGN PATENT DOCUMENTS

| EP | 2799855 A1 | 11/2014 |
| JP | 4623870 B2 | 2/2011 |
| JP | 2014-114153 A | 6/2014 |
| JP | 2014-222209 A | 11/2014 |
| JP | 2014-232102 A | 12/2014 |

OTHER PUBLICATIONS

Extended European Search Report issued in counterpart European Patent Application No. 21171180.9 dated Oct. 1, 2021.
Office Action dated Jul. 12, 2023, issued in corresponding European Patent Application No. 21171180.9.

* cited by examiner

*Primary Examiner* — Brian K Talbot
(74) *Attorney, Agent, or Firm* — Morgan, Lewis & Bockius LLP

(57) ABSTRACT

A manufacturing method for an electrochemical sensor includes an electrode forming step of forming an electrode, made of a porous material with electroconductivity, on an insulating substrate, and a resist forming step of coating a coating region on the electrode by a resist with non-electroconductivity in a solution state, and permeating communicating pores of the porous material with the resist, thereby adjusting a resistance value of the electrode.

10 Claims, 8 Drawing Sheets

FIG. 1A
FIG. 1B
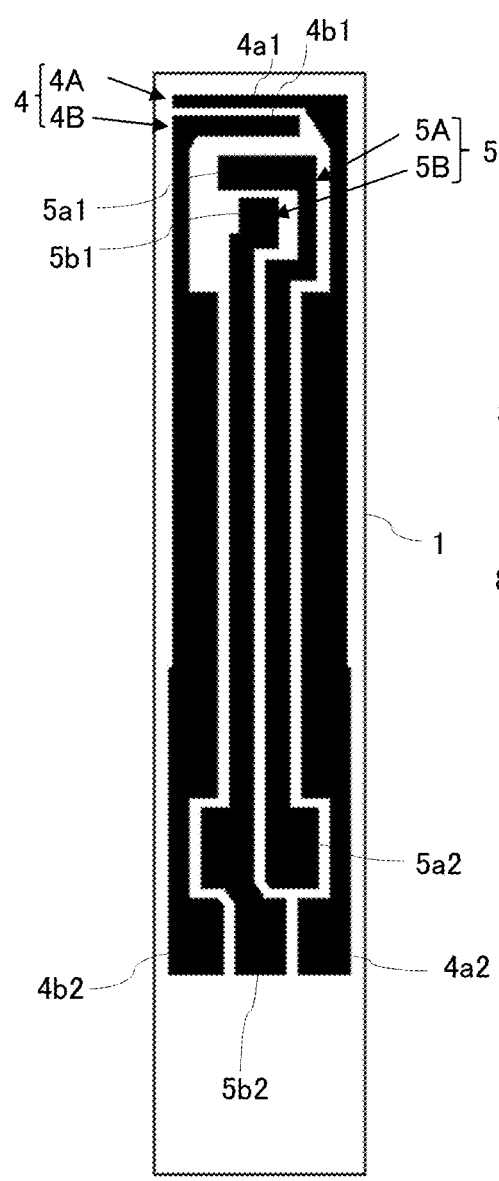
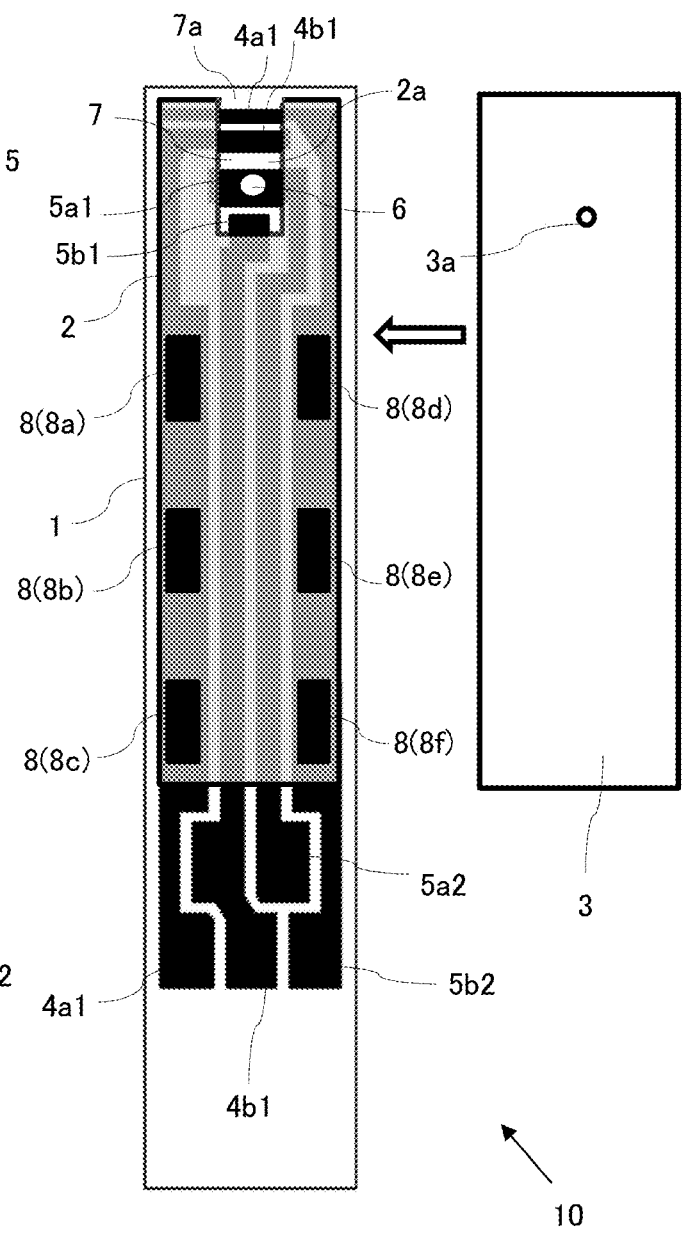
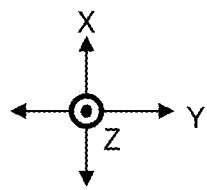

MANUFACTURING METHOD FOR ELECTROCHEMICAL SENSOR, AND ELECTROCHEMICAL SENSOR

CROSS-REFERENCE TO RELATED APPLICATION

This application claims the benefit of Japanese Patent Application No. 2020-081128 filed on May 1, 2020 in the Japanese Patent Office, the disclosure of which is herein incorporated in its entirety by reference.

BACKGROUND OF THE INVENTION

1. Field of the Invention

The present invention relates to a manufacturing method for an electrochemical sensor, and to the electrochemical sensor.

2. Description of the Related Art

There conventionally is an analyzing instrument which has a hematocrit electrode and a glucose electrode, and in which a value of glucose detected using the glucose electrode is corrected by using a hematocrit value detected by an impedance method using the hematocrit electrode (e.g., Japanese Patent Application Publication No. 2014-232102). There also is an analyzing device that, at the time of measuring an analyte, measures a resistance value of a resistance value holding part formed using the same material as that of an electrode, and corrects the measurement value on the basis of the resistance value (e.g., Japanese Patent Application Publication No. 2014-114153). There also is a biosensor in which a resistor can be set to be variable on an electroconductive line (e.g., Japanese Patent No. 4623870). There also is technology in which, at the time of manufacturing, a base metal electrode is heated using a flash lamp, and the resistance value is lowered by removing distortion generated in the forming (e.g., Japanese Patent Application Publication No. 2014-222209).

SUMMARY OF THE INVENTION

Hematocrit measurement using an impedance method that uses the analyzing instrument according to Japanese Patent Application Publication No. 2014-232102, has been lacking in accuracy in measurement results in some cases, due to the effects of change in the resistance value of the hematocrit electrode itself. That is to say, measurement in cases where no reagent is used for measurement of measurement items is lower in measurement sensitivity, as compared to cases of measurement in which the reagent is used, and the effects of change in the resistance value of the electrode itself are great. Accordingly, even if the difference between the resistance value of an actually-formed electrode and a target resistance value envisioned as a targeted resistance value is small, there is deviation from accurate measurement results (hematocrit value). In a case in which the electrode is a carbon electrode formed by screen printing, as described in Japanese Patent Application Publication No. 2014-232102, the resistance value of the carbon electrode changes in accordance with change in printing conditions, drying conditions, and material lot, and accordingly deviation from the target resistance value readily occurs. Conventionally, the printing thickness is increased or reduced, or the drying temperature is raised or lowered, or the like, in order to adjust change in the resistance value.

However, changing printing conditions and drying conditions readily leads to variance in shapes of the analyzing instrument, which might affect performance and quality. Changing printing conditions, such as changing printing area or changing printing amount, results, for instance, in difficulty in making the electrode area uniform, or change in the roughness of the surface of the electrode that occur more readily. Such change might cause change in a dispensing area of a reaction reagent at the glucose electrode where a reagent other than that of the hematocrit electrode is dispensed, affecting measurement performance. Also, changing drying conditions, such as changing the drying temperature, for example, might lead to deformation of an insulating substrate supporting the electrode.

It is conceivable to apply the technology described in Japanese Patent Application Publication No. 2014-114153 and perform computation correction of the resistance value, instead of adjusting resistance values by changing printing conditions or drying conditions. However, that necessitates preparing not only a separate resistance value holding portion, but also means for measuring a resistance value of the resistance value holding portion at the time of measurement, leading to higher manufacturing costs and longer measurement times.

Also, application of the technology described in Japanese Patent No. 4623870 is impractical, due to high manufacturing costs of the sensor and extremely poor operability. Further, the technology described in Japanese Patent Application Publication No. 2014-222209 does not take into consideration the resistance value of the base metal electrode itself, and accordingly cannot address problems accompanying change in the resistance value of the electrode.

An object of an embodiment of the present invention is providing a manufacturing method for an electrochemical sensor and the electrochemical sensor each of which the resistance value of an electrode to be formed for an electrochemical sensor can be adjusted even if there is change in the resistance value of the electroconductive material forming the electrode, and accordingly measurement items can be accurately measured.

One of embodiments of the present invention is a manufacturing method for an electrochemical sensor, the method comprises an electrode forming step of forming an electrode, made of a porous material with electroconductivity, on an insulating substrate, and a resist forming step of coating a coating region on the electrode by a resist with non-electroconductivity in a solution state, and permeating communicating pores of the porous material with the resist, thereby adjusting a resistance value of the electrode.

Also, another one of embodiments of the present invention is for an electrochemical sensor by the manufacturing method.

According to the embodiments of the present invention, the resistance value of an electrode to be formed for an electrochemical sensor can be adjusted even if there is change in the resistance value of the electroconductive material forming the electrode, and accordingly measurement items can be accurately measured.

BRIEF DESCRIPTION OF THE DRAWINGS

FIGS. 1A and 1B are diagrams for describing an example of a biosensor manufactured by a manufacturing method according to an embodiment;

DESCRIPTION OF THE PREFERRED EMBODIMENTS

Figure 2:
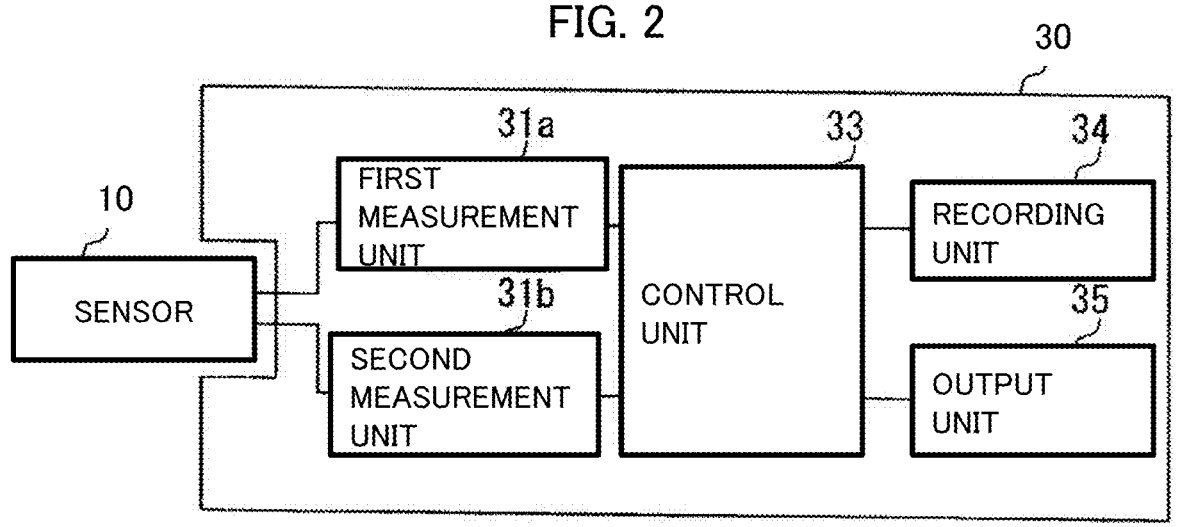
FIG. 2 is a block diagram illustrating a configuration example of a blood glucose meter, which is an example of a measurement device.

A manufacturing method for an electrochemical sensor according to an embodiment of the present invention includes the following.

(1) An electrode forming step of forming an electrode on an insulating substrate using a porous electroconductive material.

(2) A resist forming step of coating a coating region on the electrode by a non-electroconductive resist in a solution state and permeating communicating pores of the porous material with the resist, thereby adjusting the resistance value of the electrode.

The above steps have been derived through the following findings made by the Inventor of the present application. An electrode formed of a porous electroconductive material on an insulating substrate can be conceived as being a conductor that is L m in length and that has a cross-sectional area of S m². The resistance value R of this conductor is expressed by the following Expression $$R=\rho L/S$$

where $\rho$ is the resistivity $\Omega \cdot m$ of the conductor.

The length L and cross-sectional area S of the electrode are constant values due to screen printing of the porous electroconductive material (e.g., carbon ink). Accordingly, the resistance value R of the electrode is dependent on the resistivity $\rho$ of the porous electroconductive material. Accordingly, making the resistivity $\rho$ to be constant makes the resistance value R of the electrode to be constant, and accordingly measurement items to be measured using the electrode can be measured in a stable manner.

The method for changing the resistivity $\rho$ to adjust (or to control, to keep within a predetermined range, to make constant) the resistance value of the electrode is to change the coating region of coating upon the electrode. In principle, the following method is used. The electroconductive material such as carbon, which is the material of the electrode, is porous, and when coating (resist printing) is performed on the electroconductive material by the resist of the non-electroconductive material in a solution state, the resist invades the communicating pores of the porous electroconductive material. As a result, portions containing the resist in the electrode are configured of the non-electroconductive material, and accordingly the resistivity of the electrode is higher than the resistivity of the electroconductive material. This principle can be used to change the resistivity of the electrode by changing the printing area of resist on the electrode, and consequently adjust the resistance value of the electrode. Note that when manufacturing, resist printing is preferably performed before the electroconductive material is completely solidified, for the resist to invade the communicating pores of the electroconductive material.

The coating region is preferably determined on the basis of index information in the manufacturing method for the electrochemical sensor. The index information may be information directly indicating the resistance value of the electrode, or may be information indirectly indicating the resistance value thereof. Information directly indicating the resistance value is, for example, resistance value (actual measurement value) of an electrode of an electrochemical sensor other than the electrochemical sensor to be manufactured. The other electrochemical sensor may be an electrochemical sensor that is an actual product (actual sensor), or may be an electrochemical sensor manufactured for testing (test sensor). That is to say, the resistance value of an electrode of an actual sensor may be measured, or resistance value (actual measurement value) of a test electrochemical that a test sensor is provided with may be measured. The test electrode is an electrode formed using the same material and the same manufacturing conditions as the electrochemical sensor, and that is coated with the resist at a coating region of a predetermined pattern. The "same material" means material that is not only the same material but that has been manufactured at the same time by the same manufacturing step, and the "same manufacturing conditions" means being manufactured in the same manufacturing facilities, under substantially the same external environment such as temperature, humidity, and so forth, and preferably under conditions of being manufactured at the same manufacturing facilities without difference in measurement date and time, such as within one hour.

Information indirectly indicating the resistance value is, for example, information that can be recorded along with periodic measurement of actual electrochemical sensors, and includes information indicating the external environment at the time of measuring the resistance value, for example. Examples of information indicating the external environment include season, humidity, temperature, windspeed, barometric pressure, and so forth. Also, information indirectly indicating the resistance value may include quality of manufacturing facilities (resist coating device, drying device, etc.) of the electrochemical sensor, i.e., information indicating the usage time of the manufacturing facilities, and degree of wear or deterioration, and the density and the number of communicating pores of the porous material of the electrode. Also, information indirectly indicating the resistance value may include information and so forth of the quantity of electrochemical sensors formed from the same material and by the same manufacturing conditions as the above electrode. Such information can be used as information for experimentally estimating resistance values. The number of information items making up the index information may be one or a plurality. In a case of using information indirectly indicating the resistance value, a combination of a plurality of information items is preferably used.

The manufacturing method for the electrochemical sensor may further include a step of determining the coating region, which is a region on the electrode, to be coated by the resist in the resist forming step. In the resist forming step, the determined coating region is coated by resist. The manufacturing method for the electrochemical sensor may employ the following configuration. That is to say, a plurality of different resist printing patterns are prepared for the coating region, and in the resist forming step, the coating region corresponding to one resist printing pattern selected from the plurality of resist printing patterns is coated by resist.

The manufacturing method for the electrochemical sensor preferably employs the following configuration. That is to say, a plurality of adjustment regions are set on the electrode, and the coating region is selected from the plurality of adjustment regions. The number of the adjustment regions differs among the plurality of resist printing patterns.

The manufacturing method for the electrochemical sensor preferably employs the following configuration. That is to say, the area of the coating region and the resistance value of the electrode have a relation in which the larger the area of the coating region is, the more the resistance value of the electrode increases, and a resist printing pattern corresponding to the amount of increase or reduction of the resistance value of the electrode by adjustment is selected from the plurality of resist printing patterns having different areas of the coating region in the coating region determining step.

The manufacturing method for the electrochemical sensor also preferably employs the following configuration. That is to say, the electrode is provided with a measurement portion and a lead portion connected to the measurement portion, and the coating region is defined upon the lead portion.

The manufacturing method for the electrochemical sensor also preferably employs the following configuration. That is to say, in the resist forming step, the coating region is coated by the resist on the basis of index information corresponding to the resistance value of the electrode.

The manufacturing method for the electrochemical sensor also preferably employs the following configuration. That is to say, a target resistance value that is a target value for the resistance value of the electrode, and a target resistance value regarding which a reference coating region that is a coating region for attaining the target resistance value for the resistance value of the electrode is determined in advance, are set, and the index information is information indicating a high/low level of the resistance value of the electrode relative to the target resistance value. In a case where the resistance value of the electrode is higher than the target resistance value, the coating region is made to be smaller than the reference coating region, while in a case where the resistance value of the electrode is lower than the target resistance value, the coating region is made to be larger than the reference coating region.

The manufacturing method for the electrochemical sensor also preferably employs the following configuration. In the coating region determining step, the coating region is determined on the basis of a difference between an actual measurement value of the resistance value of the electrode of the test sensor and a target resistance value in which a reference coating region is set in advance. The resistance value of the electrode of the test sensor is a resistance value in a defined section including the coating region of the predetermined pattern, for example.

The porous electroconductive material is carbon, for example, but may be a material other than carbon. The resist is non-electroconductive, and is an acrylic monomer (acrylic resin), for example. The acrylic monomer is an acrylic resin material used in an ultraviolet (UV) curing resist ink, and is an example of a "non-electroconductive material".

The manufacturing method for the electrochemical sensor may also employ a configuration in which a reagent dissolvable in a liquid sample is not provided in the electrode (not including a step of providing a reagent to the electrode).

Note however, that a reagent may be provided to the electrode. Provision of the reagent is dependent on measurement items for which the electrode is used, for example. An example of a measurement item that does not use a reagent is hematocrit value, but may be other than hematocrit value.

Embodiment

An embodiment of the present invention will be described below with reference to the figures. The configuration of the embodiment described below is exemplary, and the present invention is not limited to the configuration of the embodiment. An electrochemical sensor that is an example of an analyte analyzing instrument, and a manufacturing method thereof, will be described below. The analyte (also referred to as "sample") includes biological samples and dummy analytes other than biological samples (control liquid, etc.). Samples include samples in liquid. Examples of biological samples include blood, interstitial fluid, urine, and so forth. Also, components that are the object of measurement in the samples (measurement items) may be substances generated in vivo, or may be substances assimilated in vivo by ingestion.

Components that are the object of measurement include glucose (blood glucose), lactate (lactic acid), cholesterol, hematocrit, and so forth. Components that are the object of measurement may further include alcohol, sarcosine, fructosyl amine, pyruvic acid, lactic acid, hydroxybutyric acid, and ascorbic acid.

A detection layer may be provided in some cases, depending on the type of the components that are the object of measurement. Detection layers contain components that react with components that are objects of measurement. Examples of components that react with the components that are the object of measurement include enzymes and redox substances. Examples of enzymes include glucose oxidase (GOD), glucose dehydrogenase (GDH), and so forth, although this depends to the type of the sample and the components that are the object of measurement. Note however, that enzymes are not limited to these. Examples components other than enzymes that react with components that are the object of measurement, such as redox substances for example, include metal complexes and so forth.

Configuration of Electrochemical Sensor

In the present embodiment, a biosensor is exemplified that is capable of measuring hematocrit values and glucose values as components that are the object of measurement in samples of blood or interstitial fluid, as an example of an electrochemical sensor. FIGS. 1A and 1B are diagrams for describing an example of the electrochemical sensor manufactured by a manufacturing method according to the embodiment. The electrochemical sensor 10 includes a strip-like insulating substrate 1, a hematocrit electrode 4 that is an electrode for hematocrit measurement in a sample, and a glucose electrode 5 that is an electrode for glucose measurement in a sample, the hematocrit electrode 4 and the glucose electrode 5 being formed on the insulating substrate 1, as illustrated in FIGS. 1A and 1B.

Materials of the insulating substrate 1 include synthetic resin (plastic), for example. Various types of resin, such as plastic, include polyether imide (PEI), polyethylene terephthalate (PET), polyethylene (PE), polystyrene (PS), polymethyl methacrylate (PMMA), polypropylene (PP), polyimide resin, acrylic resin, epoxy resin, glass epoxy, and so forth, for example, can be applied. Insulating material other than synthetic resin may be applied as material for the insulating substrate 1. Examples of insulating materials other than synthetic resin include paper, glass, ceramics, biodegradable materials, and so forth.

The hematocrit electrode 4 is an electrode pair made up of an electrode 4A and an electrode 4B. The electrode 4A includers a measurement portion 4a1 and a lead portion 4a2 connected to the measurement portion 4a1. The measurement portion 4a1 is disposed at one end portion of the insulating substrate 1 and extends in the lateral direction (Y direction) of the insulating substrate 1. The lead portion 4a2 extends in the longitudinal direction (X direction) of the insulating substrate 1, from one end portion of the insulating substrate 1 to the other end portion, and has one end connected to the measurement portion 4a1 and another end disposed at the other end portion of the insulating substrate 1. The electrode 4B includers a measurement portion 4b1 and a lead portion 4b2 connected to the measurement portion 4b1. The measurement portion 4b1 is disposed in the proximity of the measurement portion 4a1, and extends in the lateral direction of the insulating substrate 1. The lead portion 4b2 extends in the longitudinal direction of the insulating substrate 1, from one end portion of the insulating substrate 1 to the other end portion, and has one end connected to the measurement portion 4b1 and another end disposed at the other end portion of the insulating substrate 1. The measurement portions 4a1 and 4b1 are each an example of a "measurement portion".

The glucose electrode 5 is an electrode pair made up of an electrode 5A and an electrode 5B. The electrode 5A includes a glucose measurement portion 5a1 and a lead portion 5a2. The glucose measurement portion 5a1 is disposed at one end portion of the insulating substrate 1 and extends in the lateral direction (Y direction) of the insulating substrate 1. The lead portion 5a2 extends in the longitudinal direction (X direction) of the insulating substrate 1, from one end portion of the insulating substrate 1 to the other end portion, and has one end connected to the glucose measurement portion 5a1 and another end disposed at the other end portion of the insulating substrate 1. The electrode 5B includers a glucose measurement portion 5b1 and a lead portion 5b2. The glucose measurement portion 5b1 is disposed in the proximity of the glucose measurement portion 5a1. The lead portion 5b2 extends in the longitudinal direction (X direction) of the insulating substrate 1, from one end portion of the insulating substrate 1 to the other end portion, and has one end connected to the glucose measurement portion 5b1 and another end disposed at the other end portion of the insulating substrate 1.

The hematocrit electrode 4 and the glucose electrode 5 are each electrodes made of carbon (carbon electrodes), and are formed by printing carbon ink on the insulating substrate 1 by screen printing. Carbon is an example of a porous electroconductive material. Note however, that the porous electroconductive material may be other than carbon. That is to say, any electroconductive material may be used as long as a great number of porous communicating pores are formed on and in the electroconductive material so that later-described resist permeates the communicating pores, and electricity can be passed therethrough, thus forming an electrode. Also, an arrangement may be made in which only the hematocrit electrode 4 is a porous electroconductive material.

Screen-printed resist (referred to simply as "resist") 2 is formed by printing or coating of resist ink on the insulating substrate 1 on which the hematocrit electrode 4 and the glucose electrode 5 are printed. Any material may be used as the resist ink as long as a non-electroconductive material that can be fixed on the electrodes by drying or the like. A non-electroconductive solute is preferable, and resin is further preferable. In the present embodiment, UV-curing resist ink is used as one example.

The resist 2 is formed so as to coat a coating region on the hematocrit electrode 4 in order to adjust the resistance value of the electrode. The term "coating by resist" in the present invention means to coat with resist in a solution state so as to permeate the communicating pores of the porous material formed on and in the electrode. In the example illustrated in FIGS. 1 A and 1B, the resist 2 is provided from one end portion of the insulating substrate 1 to an intermediate portion thereof, in a rectangular form. Note however, that a rectangular notched portion 2a is formed at the one end portion of the insulating substrate 1. The middle portions of each of the measurement portion 4a1, the measurement portion 4b1, the glucose measurement portion 5a1, and the glucose measurement portion 5b1 of the insulating substrate 1 are exposed at the notched portion 2a. The notched portion 2a serves as a channel 7 for samples, having an inlet 7a, by attaching of a cover 3.

One of the measurement portions 4a1 and 4b1 exposed at the channel 7 is used as a working electrode of the hematocrit electrode 4 and the other is used as the counter electrode of the hematocrit electrode 4. In the present embodiment, the measurement portion 4b1 is used as the working electrode and the measurement portion 4a1 is used as the counter electrode, which is decided by the electrical connection method between a later-described measurement device and the lead portions 4a2 and 4b2. Also, one of the glucose measurement portions 5a1 and 5b1 exposed at the channel 7 is used as a working electrode of the glucose electrode 5 and the other is used as the counter electrode of the glucose electrode 5. In the present embodiment, the glucose measurement portion 5a1 is used as the working electrode and the glucose measurement portion 5b1 is used as the counter electrode, which is decided by the electrical connection method between the later-described measurement device and the lead portions 5a2 and 5b2.

Nothing is provided in the measurement portions 4a1 and 4b1 of the hematocrit electrode 4 in the present embodiment, including reagents. Note however, that reagents or films may be provided as long as they do not react with components other than the components that are the object of measurement in the sample and affect measurement of the components that are the object of measurement such as hematocrit values and so forth. Conversely, a reagent that reacts with a component that is the object of measurement in the sample is provided to the glucose electrode 5. Specifically, a detection layer 6 containing a reagent is formed on the glucose measurement portion 5a1. The detection layer 6 is formed by preparing a reagent solution containing an enzyme, binder, and mediator, for example, dribbling or coating the reagent solution onto a predetermined position of the electrode pattern (on the glucose measurement portion 5a1 in the present embodiment), and hardening the reagent solution by drying. The enzyme is GOD or GDH in the present embodiment, but the type of enzyme depends to the object of measurement and component. Note that there are cases in which the detection layer 6 does not contain a mediator.

Also, the resist 2 is not provided at the other end portion of the insulating substrate 1, and the other end of each of the lead portion 4a2, the lead portion 4b2, the lead portion 5b1, and the lead portion 5b2 are exposed. The lead portion 4a2, the lead portion 4b2, the lead portion 5b1, and the lead portion 5b2, which are exposed, are each used as pads (terminals) for electric connection to a connector 26 that the measurement device is provided with.

The resist 2 is provided so as to coat a coating region on the hematocrit electrode 4. In the example illustrated in FIGS. 1A and 1B, printing of the resist 2 is performed such that non-printed regions (exposed regions) 8 that are not coated by the resist 2, but are exposed, are formed at parts of intermediate portions of the lead portion 4a2 and the lead portion 4b2 of the hematocrit electrode 4 between one end and the other end thereof, in the coating of the coating region. In the example illustrated in FIG. 1B, three rectangular non-printed regions 8a, 8b, and 8c are formed at the intermediate portion of the lead portion 4b1, and three rectangular non-printed regions 8d, 8e, and 8f are formed at the intermediate portion of the lead portion 4b2.

In the example illustrated in FIG. 1B, the non-printed regions 8a and 8d, 8b and 8e, and 8c and 8f respectively form pairs, and have the same area, but the area may be different from each other among these pairs. In the present embodiment, the non-printed regions 8a through 8f have the same area. The number of non-printed regions 8 relative to one lead portion may be any appropriate number of one, two, or four or more, except three. The shape of the non-printed regions 8 is not limited to rectangles, and may be triangles or other polygons, circles, ellipses, or combinations of these shapes. Also, all edge portions of the non-printed regions 8 are not required to be on the lead portions, and part of the edge portions may extend onto the insulating substrate 1.

The pattern of the coating region is not limited to only a pattern in which non-printed regions are formed at the intermediate portion, and may be a pattern in which a portion at which the other end of the lead portion is exposed is broader (in other words, the length of the resist in the longitudinal direction of the substrate 1 is short) at the other end portion of the substrate 1. Also, the pattern of the coating region may include a pattern in which non-printed regions are formed only on one of the electrodes 4A and 4B. That is to say, any method may be employed as long as a method by which the area of the coating region that is coated upon the electrodes can be adjusted.

The rectangular cover 3 that has the same size as a rectangular region on which the resist 2 is printed on the insulating substrate 1 is placed on the upper face of the rectangular region, and the upper face of the resist 2 and the lower face of the cover 3 are bonded to each other. The same material as that of the insulating substrate 1 may be used for the material of the cover 3. Double-sided tape, adhesive agent, or the like is used for bonding of the cover 3.

The upper face of the channel 7 is covered by the cover 3, and the channel 7 is a tubular space (called a capillary) that externally communicates through the inlet 7a and an air hole 3a formed on the cover 3. The lower face of the cover 3 exposed inside the channel 7 is a hydrophilic face, due to being coated by a hydrophilic material or the like.

When using the electrochemical sensor, bringing a sample (blood or the like) into contact with the inlet 7a (also referred to as spot deposition), capillary action causes the sample to be drawn into the channel 7. The glucose electrode 5 (glucose measurement portions 5a1 and 5b1) is situated deeper from the inlet 7a than the hematocrit electrode 4 (measurement portions 4a1 and 4b1). This configuration is made so that the reagent dissolved by the sample does not readily come into contact with the hematocrit electrode 4, so that the process is not affected by the reagent.

Note that although an example is illustrated in FIGS. 1A and 1B in which an electrode pair for hematocrit measurement (electrodes 4A and 4B) and an electrode pair for glucose measurement (glucose measurement portions 5A and 5B), i.e., a total of four electrodes, are provided, hematocrit values and glucose values may be measured in some cases using three or fewer electrodes. Also, the glucose electrodes may have a three-electrode configuration having a working electrode, counter electrode, and reference electrode.

Configuration Example of Measurement Device

FIG. 2 is a block diagram illustrating a configuration example of a blood glucose meter 30, which is an example of a measurement device. The blood glucose meter 30 is provided with a first measurement unit 31a, a second measurement unit 31b, a control unit 33, a recording unit 34, and an output unit 35. The first measurement unit 31a is a circuit that measures a first electrical response as to a first signal input to a glucose electrode 5 that is capable of coming into contact with a sample (blood). The second measurement unit 31b is a circuit that measures electrical response as to a second signal input to the hematocrit electrode 4 that is capable of coming into contact with a sample. Now, the second signal includes a waveform in which the value changes from a first level to a second level, and maintains the second level for a certain amount of time thereafter. The second measurement unit 31b is a circuit that measures the second electrical response as to this second signal as a peak value in a response signal as to the change of the second signal. The control unit 33 corrects a value indicating glucose concentration in the blood, obtained from the first electrical response, on the basis of the peak value of the response signal measured by the second measurement unit 31b. The value indicating the corrected glucose concentration is recorded by the recording unit 34 and displayed on a display screen by the output unit 35, for example.

The control unit 33 can be realized by a processor provided to a computer of the measurement device executing a predetermined program. For example, a microcontroller can be built into the blood glucose meter 30.

The first measurement unit 31a applies a direct current (DC) signal, for example, as the first signal, to the glucose electrode 5 pair in contact with blood in a state of having reacted with the reagent of the detection layer 6, on the basis of an instruction from the control unit 33, and measures a response signal thereof as the first electrical response. The control unit 33 can determine a value indicating glucose concentration on the basis of the response signal value.

The second measurement unit 31b applies a pulse signal having a square wave or trapezoid wave form, for example, as the second signal, to the hematocrit electrode 4 in contact with blood in a state of not having reacted with the reagent, on the basis of an instruction from the control unit 33. The second measurement unit 31b measures change in the signal level of the second signal, for example, the peak value of the response signal as to the leading edge of the pulse. By measuring the peak value of the response signal as to change in level in the input signal in this way, the control unit 33 can determine a hematocrit value using the peak value. That is to say, the hematocrit value can be calculated by measuring the peak current obtained by rapid change in the input signal. Further, the control unit 33 can correct the value indicating the glucose concentration obtained from the first response signal value of the first signal using the hematocrit value.

Figure 3:
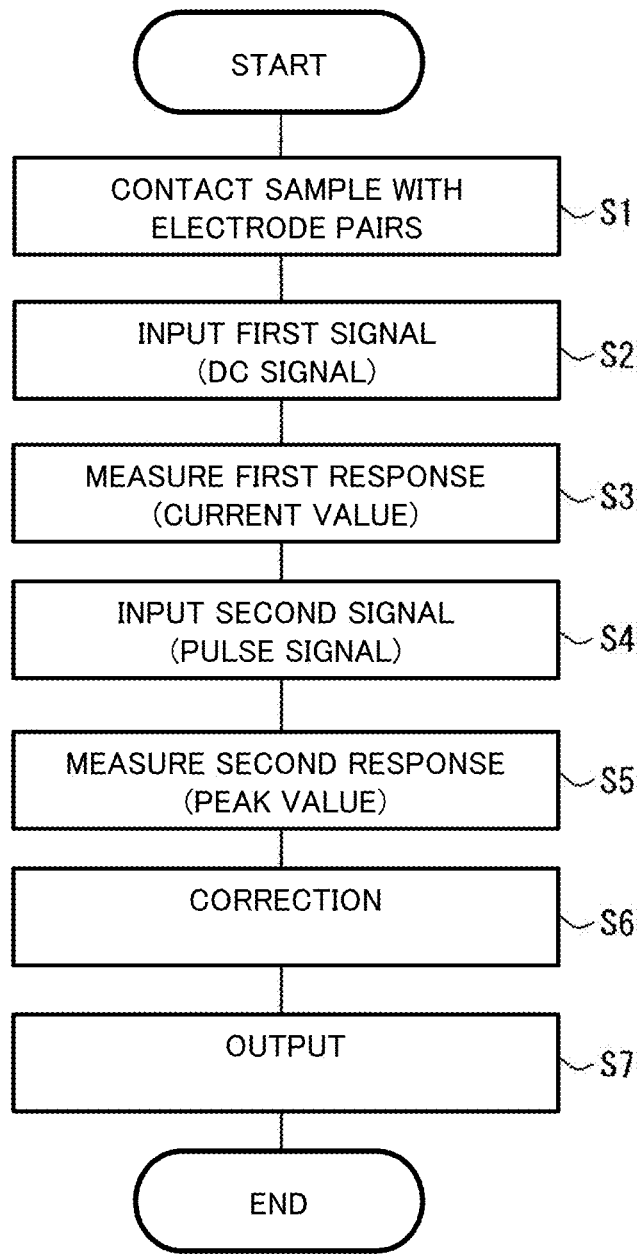
FIG. 3 is a flowchart showing an operation example of the measurement device.

FIG. 3 is a flowchart illustrating an operation example of the blood glucose meter 30. In the example illustrated in FIG. 3, measurement starts upon a sample (blood) being brought into contact with the electrode pairs of the electrochemical sensor 10 (S1). For example, when the electrochemical sensor 10 is inserted into the blood glucose meter 30, spot deposition of blood that is a sample is performed as to the electrochemical sensor 10, and introduction of blood into the channel 7 is detected, the control unit 33 starts measurement.

The control unit 33 applies the first signal to the sample (S2). For example, the control unit 33 outputs an instruction to the first measurement unit 31a to apply a DC signal as the first signal to the glucose electrode 5 pair. The detection layer 6 is provided to the glucose electrode 5 pair, and the blood comes into contact with the glucose electrode 5 pair in a state of having reacted with the reagent.

The first measurement unit 31a measures the first electrical response of the sample as to the first signal (S3). For example, the first measurement unit 31a can measure the response current as to the DC signal, perform analog-to-digital (A/D) conversion thereof, and transmit to the control unit 33.

Upon acquiring the first electrical response of the sample as to the first signal, the control unit 33 performs input of the second signal (S4). For example, the control unit 33 outputs an instruction to the second measurement unit 31b, to apply a pulse signal that is the second signal to the hematocrit electrode 4 pair. Blood in a state of having not reacted with the reagent comes into contact with the hematocrit electrode 4. The control unit 33 can instruct the second measurement unit 31b regarding the leading edge time, cycle, amplitude, duration of time of application, and so forth, of the pulse signal for example.

The second measurement unit 31b measures the second electrical response of the blood as to the second signal (S5). For example, the second measurement unit 31b measures the peak value of the response signal as to the leading edge of the pulse of the second signal. The second measurement unit 31b may perform A/D conversion of the peak value of the response signal and perform transmission thereof to the control unit 33, or may perform A/D conversion of a value of the response signal detected over a predetermined cycle (e.g., 0.1 microseconds) and perform transmission thereof to the control unit 33.

The control unit 33 calculates the value of the component that is the object of correction (glucose value) contained in the blood, using the first electrical response acquired in S3, and also calculates the value indicating the amount of the component that is the object of measurement (hematocrit value) contained in the blood, using the second electrical response acquired in S5. Accordingly, a glucose value, in which the glucose value in the blood acquired from the first electrical response in S3 is subjected to hematocrit correction on the basis of the peak value of the response signal obtained in S5, is obtained (S6).

For example, in S6, the control unit 33 can determine a value indicating the amount of hematocrit in the blood, using the peak value of the response signal acquired in S5. The hematocrit value can be obtained by substituting the peak value into a calculation expression recorded in advance, for example. Alternatively, the control unit 33 can determine the hematocrit value by referencing a table in which the peak value of the response signal and the hematocrit value are recorded in a correlated manner. The control unit 33 can correct the value of glucose obtained from the first electric response, using the determined hematocrit value. Note that an arrangement may be made in which no conversion is made from the peak value to the hematocrit value, and the peak value (response current value or response voltage value) is used without conversion for correction of the glucose value.

The glucose value corrected in S6 is recorded in the recording unit 34, and displayed on a display screen by the output unit 35 (S7). The output unit 35 can also transmit the value to another device, via a wired or a wireless network. Note that a measurement device and a measurement method having the same configuration as the measurement device and the measurement method disclosed in Japanese Patent Application Publication No. 2014-232102 can be applied to the electrochemical sensor according to the present embodiment.

Verification Experiment

The Inventor of the present application performed the following verification experiment, and confirmed that the resistance value of electrodes can be controlled by the area of covering over the electrodes with resist. The Inventor also found that the coating region for resistance value control can be determined by setting the coating region for coating on the hematocrit electrode 4 in a later-described second printing pattern to be a "reference coating region" and comparing the resistance value of the hematocrit electrode 4 in a case of coating the standard coating region with resist as to a target resistance value. The target resistance value is a resistance value that is a target for the hematocrit electrode 4 of the electrochemical sensor 10 that is to be manufactured.

Figure 4:
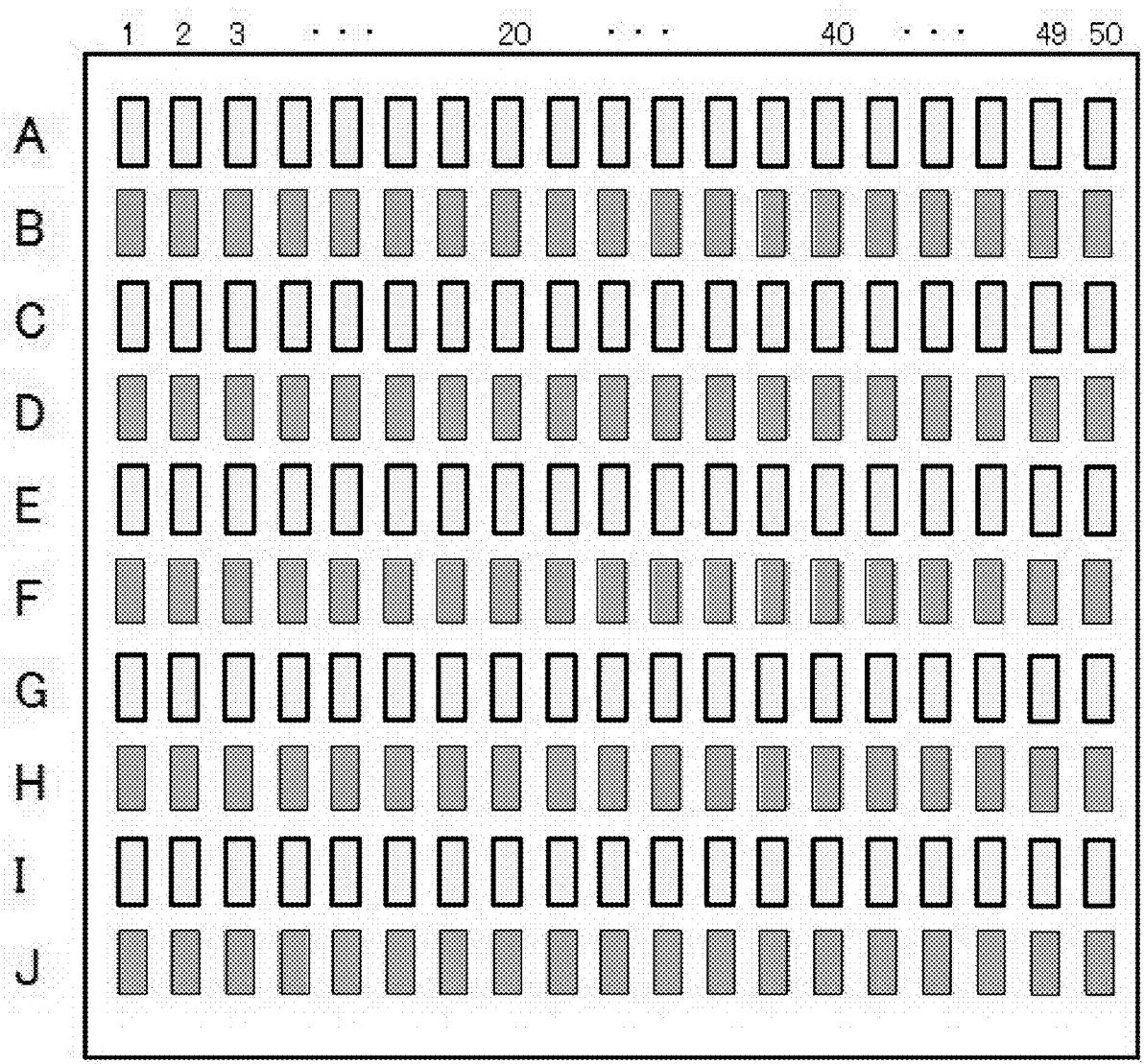
FIG. 4 illustrates an example of an insulating substrate sheet, upon which an electrode pattern and resist have been printed.
Figure 5A:
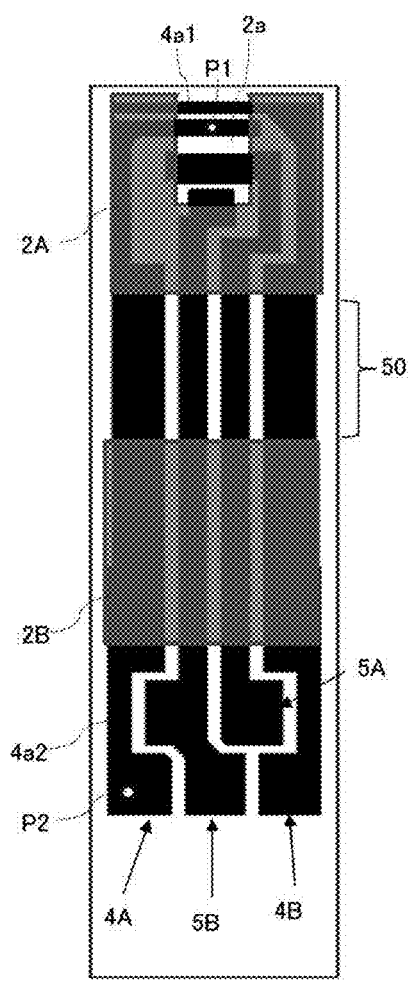
FIGS. 5A and 5B illustrate each of a first printing pattern and a second printing pattern printed on the insulating substrate sheet.
Figure 5B:
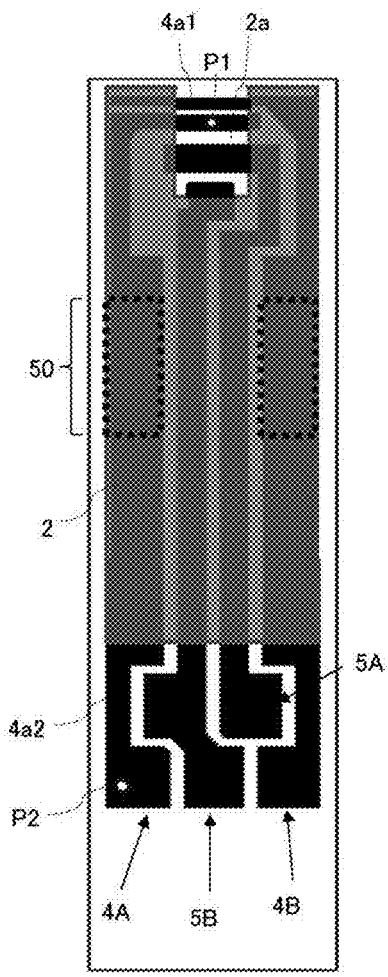

FIG. 4 illustrates an example of an insulating substrate sheet upon which an electrode pattern and a resist printing pattern have been printed, upon which covers 3 are provided by double-sided tape, to form a plurality of (five hundred) electrochemical sensors, which were used in the verification experiment. FIGS. 5A and 5B illustrate each of a first printing pattern and a second printing pattern of the plurality of electrochemical sensors printed on the insulating substrate sheet illustrated in FIG. 4. Note that the cover 3 is omitted from illustration. The configuration of the electrochemical sensor illustrated in FIGS. 5A and 5B is the same as the electrochemical sensor 10 illustrated in FIGS. 1A and 1B, except for the point that the coating region by the resist 2 is different.

As illustrated in FIG. 4, electrode patterns and resist printing patterns (strips) for 10 rows (A to J) by 50 columns (1 to 50) of strip-like electrochemical sensors 10 are printed on a single insulating substrate sheet. Note that FIG. 4 illustrates fewer than 50 columns, for the sake of simplification. The number of rows and the number of columns are exemplary, and may be changed as appropriate.

Of the 10 rows of rows A to J, electrodes and resist are printed according to the first printing pattern on odd-numbered rows (rows A, C, E, G, and I), and electrodes and resist are printed according to the second printing pattern on even-numbered rows (rows B, D, F, H, and J). Cutting the one insulating substrate sheet yields 500 a total of electrochemical sensor pieces, which are 250 electrochemical sensors of the first printing pattern and 250 electrochemical sensors of the second printing pattern.

In the second printing pattern (corresponding to the second resist printing pattern) illustrated in FIG. 5B, the hematocrit electrode 4 (electrodes 4A and 4B) and the glucose electrode 5 (electrodes 5A and 5B) are printed, and resist is printed on almost the entire face of the rectangular region where resist is printed (excluding the notched portion 2a). The coating region of the hematocrit electrode 4 in the second printing pattern is set to be the standard coating region.

Conversely, in the first printing pattern (corresponding to the first resist printing pattern) illustrated in FIG. 5A, the electrode printing pattern is the same as with the second printing pattern. However, an adjustment region 50 of a resist area corresponding to the lead portions 4b1 and 4b2 of the hematocrit electrode 4 (see FIGS. 1A and 1B) is formed at the intermediate portion in the rectangular region where the resist 2 of the second printing pattern is printed. No resist is printed in this adjustment region 50.

As a result, the resist in the first printing pattern is made up of a resist 2A having the notched portion 2a, and a rectangular resist 2B. Thus, in the second printing pattern, the entire face of the adjustment region 50 is covered with resist ink, and the tops of the lead portions 4a2 and 4b2 (indicated by dashed lines) in the adjustment region 50 are coating regions where the resist 2 is printed. Conversely, in the first printing pattern, the tops of the lead portions 4a2 and 4b2 (see FIGS. 1A and 1B) in the adjustment region 50 are non-printing regions (exposed regions) regarding resist. Thus, the adjustment region 50 is a region where whether or not to coat over the electrodes with resist can be adjusted.

Of the 250 each electrochemical sensors, electrochemical sensors of the first column, the 20th column, and the 40th column, of rows A to J, were used in the verification experiment. While the electrochemical sensors at the first column are electrochemical sensors formed at the edge of the insulating substrate sheet, the electrochemical sensors of the 20th column and the 40th column are electrochemical sensors formed at the middle portion of the insulating substrate sheet, and accordingly the first column tends to dry more easily as compared to the 20th column and the 40th column. Also, in the verification experiment, electrochemical sensors of two patterns were used in which the double-sided tape used for bonding the cover 3 was of different thickness, one being thicker (hereinafter, "thickness 1") and the other being a thickness different from thickness 1 (hereinafter, "thickness 2").

Figure 6A:
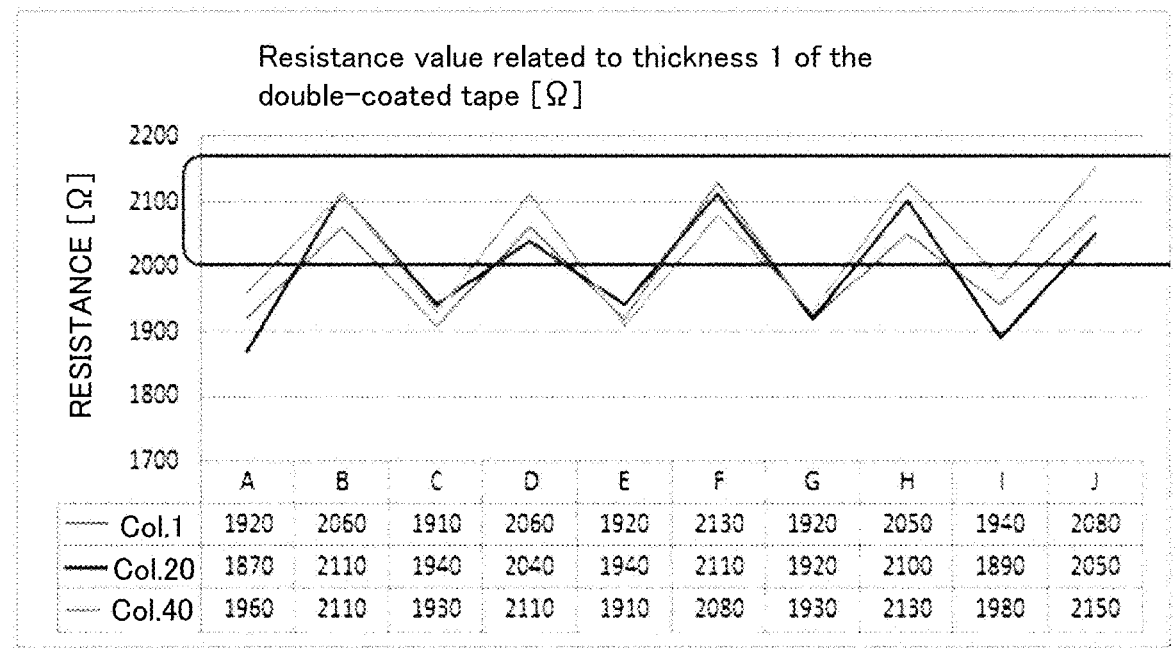
FIGS. 6A and 6B are graphs and tables showing measurement results of resistance values between the position of a measurement portion of a hematocrit electrode and the position of a lead portion, in the two patterns.
Figure 6B:
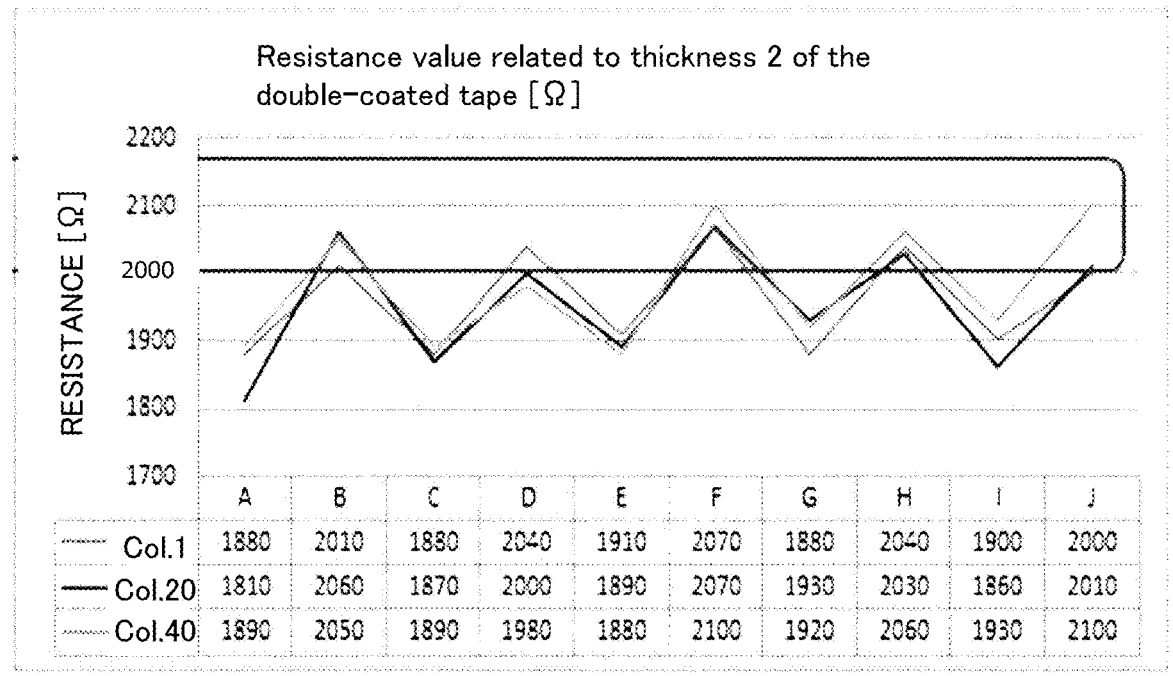

FIGS. 6A and 6B are graphs and tables showing measurement results of resistance values between a position P1 of the measurement portion 4a1 and a position P2 of the lead portion 4a2 of the hematocrit electrode 4 of each of the electrochemical sensors in the two patterns where the thickness of the double-sided tape used for the verification experiment was changed. FIG. 6A shows the results of the electrochemical sensors of thickness 1, and FIG. 6B shows the results of the electrochemical sensors of thickness 2. The A through J shown in the tables in FIGS. 6A and 6B represent the rows A through J on the insulating substrate sheet illustrated in FIG. 4, and "column 1", "column 20", and "column 40" respectively represent the first column, the 20th column, and the 40th column in rows A through J. For example, the value where "C" and "column 20" intersect is the measurement results for resistance value of the electrochemical sensor formed at the 20th column of row C. Note that the measurement position for the resistance value is not limited to the positions P1 or P2, and may be an optional position on the measurement portion 4a1 and the lead portion 4a2 at the other end, as long as across a region where the resist 2 is printed and in a defined section including this coating region (adjustment region 50). Also, the resistance value may be the resistance value between a position on the measurement portion 4b1 equivalent to the position P1 and a position on the lead portion 4b2 equivalent to the position P2 of the hematocrit electrode 4, instead of the measurement portion 4a1 of the hematocrit electrode 4.

The measurement results in FIGS. 6A and 6B show no significant difference between the two, and accordingly it can be understood that the thickness of the double-sided tape does not affect the resistance value of the electrodes.

The resistance value between the position P1 on the measurement portion 4a1 and the position P2 on the lead portion 4a2 of the electrode 4A in the first printing pattern is smaller than the resistance value between the position P1 on the measurement portion 4a1 and the position P2 on the lead portion 4a2 of the electrode 4A in the second printing pattern. The reason for this is as follows.

The electrode 4A and the electrode 4B making up the hematocrit electrode 4 can each be thought of as being a conductor that is L m in length and that has a cross-sectional area of S $m^2$. The resistance value R of this conductor is expressed by the Expression $R=\rho L/S$, where $\rho$ is the resistivity $\Omega \cdot m$ of the conductor.

The length L and the cross-sectional area S of each of the electrodes 4A and 4B are constant values due to screen printing of the carbon ink. Accordingly, the resistance value R of the electrodes 4A and 4B is dependent on the resistivity $\rho$ of the carbon ink. Accordingly, making the resistivity $\rho$ to be constant makes the resistance value R of each of the electrodes 4A and 4B to be constant. Thus, the resistance value of the electrode itself, which is a component for measuring the second electric response corresponding to a conversion value equivalent to the true value of the hematocrit is constant, regardless of the electrochemical sensor. Accordingly, electrochemical sensors can be provided that are provided with the same resistance value of the hematocrit electrode itself, with no variance among individual units. Thus, hematocrit values can be measured accurately and in a stable manner.

Accordingly, the resistance value of the electrode itself was adjusted by adjusting the printing area of the resist as to the lead portion 4a2 of the electrode 4A and the lead portion 4b2 of the electrode 4B. Carbon, which is the material of the electrodes 4A and 4B, is an electroconductive material, and also is a substance that has porosity. Conversely, the resist ink is an acrylic resin material that is a non-electroconductive material and that hardens under irradiation of UV rays. When the resist is printed on the electrodes formed of carbon, the acrylic resin material in the resist invades the communicating pores of the porous material from the surface of the carbon electrodes, where it dries and hardens. The acrylic resin material is non-electroconductive, and accordingly has a high resistance value. In the communicating pores of the carbon electrodes, the acrylic resin material acts to impede movement of electrons. Accordingly, the resistance value of the electrodes in regions where the resist is printed is higher than the resistance value of the electrodes where the resist is not printed. That is to say, $\rho$ that is the resistivity of the conductor in the Expression $R=\rho L/S$ is higher, and accordingly R that is the resistance value of the electrode is also higher. Note that the intrinsic resistivity (which can also be expressed as how little electricity is passed, or the strength of non-electroconductivity) differs depending on the non-electroconductive material used. Accordingly, the amount of change in $\rho$ that is the resistivity of the conductor when resist is printed, i.e., the effects on how high $\rho$ becomes, differs depending on the type of the non-electroconductive material used.

Accordingly, the greater the area of the resist printed on the lead portions 4a2 and 4b2 (coating region) is, the higher the resistivity $\rho$ becomes (that is to say, the area of the coating region and the resistance value of the electrode have a relation in which the larger the area of the coating region is, the higher the resistance value of the electrode becomes). The resistance values of each of the electrodes 4A and 4B in the first printing pattern are thus smaller than the resistance values of each of the electrodes 4A and 4B in the second printing pattern. The Inventor has found that this can be used to adjust the resistance values of the electrodes 4A and 4B, by changing or adjusting the area of the non-printing area of the resist 2 as to the intermediate portions of the lead portions 4a2 and 4b2. According to this principle, it is needless to say that the material of the electrodes does not have to be carbon and the resist does not have to contain an acrylic resin material, and the same principle can be applied as long as the electrodes are of a porous electroconductive material and the resist is a non-electroconductive material.

The average of 15 pieces of data (resistance values of the electrode 4A in odd-numbered rows A, C, E, G, and I) regarding electrodes according to the first printing pattern (resist printing area 0% as to the adjustment region 50), illustrated in FIG. 6A, was 1925Ω. Meanwhile, the average of 15 pieces of data (resistance values of the electrode 4A in even-numbered rows B, D, F, H, and J) regarding electrodes according to the second printing pattern (resist printing area 100% as to the adjustment region 50) was 2091Ω, and accordingly the difference between the two was 166Ω.

The average of 15 pieces of data (resistance values of the electrode 4A in odd-numbered rows A, C, E, G, and I) regarding electrodes according to the first printing pattern (resist printing area 0% as to the adjustment region 50), illustrated in FIG. 6B, was 1888Ω. Meanwhile, the average of 15 pieces of data (resistance values of the electrode 4A in even-numbered rows B, D, F, H, and J) regarding electrodes according to the second printing pattern (resist printing area 100% as to the adjustment region 50) was 2041Ω, and accordingly the difference between the two was 153Ω. Accordingly, there is a difference of approximately 150Ω in resistance value between the first printing pattern and the second printing pattern. This 150Ω is the breadth of adjustment that can be made by the printing area of resist (size of coating region) on the electrode 4A.

Specifically, in a case where the resistance value is desired to be X Ω lower than the resistance value of the electrode 4A in a test sensor in which resist has been printed following the second printing pattern, the percentage of the printing area of resist on the lead portions 4a2 and 4b2 in the adjustment region 50 (area of coating region) can be set to "percentage of X/150".

For example, in a case where the target resistance value is 2000Ω as to the results in FIG. 6A, it is sufficient to reduce the average value 2091Ω in the case of the second printing pattern (resist printing area 100% in the adjustment region 50) by approximately 90Ω. Accordingly, 45% of the lead portions 4a2 and 4b2 is the coating region in the adjustment region 50.

Thus, the area percentage of resist on the lead portions 4a2 and 4b2 in the adjustment region 50 (area percentage of coating region) can be found by the calculation expression "resistance value to be reduced/(resistance value of electrode in second printing pattern (resist printing area 100% in adjustment region 50)–resistance value of electrode in first printing pattern (resist printing area 0% in adjustment region 50))".

Note that the resistance value of the electrodes decreases linearly relative to reduction in the printing area of the resist, i.e., relative to the size of the coating region. Also, the value of "resistance value of electrode in first pattern—resistance value of electrode in second pattern" differs for each lot, i.e., in accordance with the nature of the electroconductive material itself.

It can be seen from the results in FIGS. 6A and 6B that, while there is variance in resistance values depending on the position on the insulating substrate sheet where the electrochemical sensors are fabricated, the resistance value of the first printing pattern is smaller than the resistance value of the second printing pattern. That is to say, the resistance value of the electrodes can be controlled by adjusting the area of resist coated on the electrodes.

Note that as described above, the resist area percentage (%) on the lead portions 4a2 and 4b2 in the adjustment region 50, i.e., the coating region, may be obtained in accordance with the amount of increase or decrease in resistance value, and the resist may be printed on an area corresponding to that percentage. In actual manufacturing, resist printing patterns are prepared that respectively enable the resistance value to be reduced by 25%, 50%, and 75% from the "absolute value of difference in resistance values" described above, and selection is made therefrom. This example illustrates a case of reducing the resistance value in three stages (four stages if the case of 0% is included), but the number of stages of reducing the resistance value can be set as appropriate. That is to say, resist printing patterns can be prepared in predetermined resistance value increments or in predetermined printing area increments.

In the above-described verification experiment, the first printing pattern (printing area 0% as to the adjustment region 50) and the second printing pattern (printing area 100% (full-face resist printing) as to the adjustment region 50) were prepared as resist printing patterns. However, the greatest value of the resistance value can be measured by measuring the resistance value regarding the second printing pattern, and accordingly the resist area and the resist printing pattern that reduces the resistance value by a predetermined percentage from the greatest value can be found. That is to say, the first printing pattern does not necessarily have to be used. It can be understood from the verification experiment that in manufacturing the electrochemical sensors, a configuration can be employed in which a plurality of resist printing patterns with different coating regions are prepared, and the resist printing pattern to be used for to coating with resist is selected from the plurality of resist printing patterns, thereby determining the coating region.

In actual manufacturing, instead of obtaining the area percentage as described above, a plurality of resist printing patterns are prepared corresponding to a plurality of printing area percentages, such as 25%, 50%, and 75%, respectively, with the printing percentage of the printing area in the second printing pattern as 100%, for example, and one of the plurality of resist printing patterns (printing patterns of coating regions) corresponding to the resistance value to be increased or reduced is determined on the basis of the resistance value in the second resist printing pattern.

Example of Manufacturing Method for Electrochemical Sensor

Figure 7:
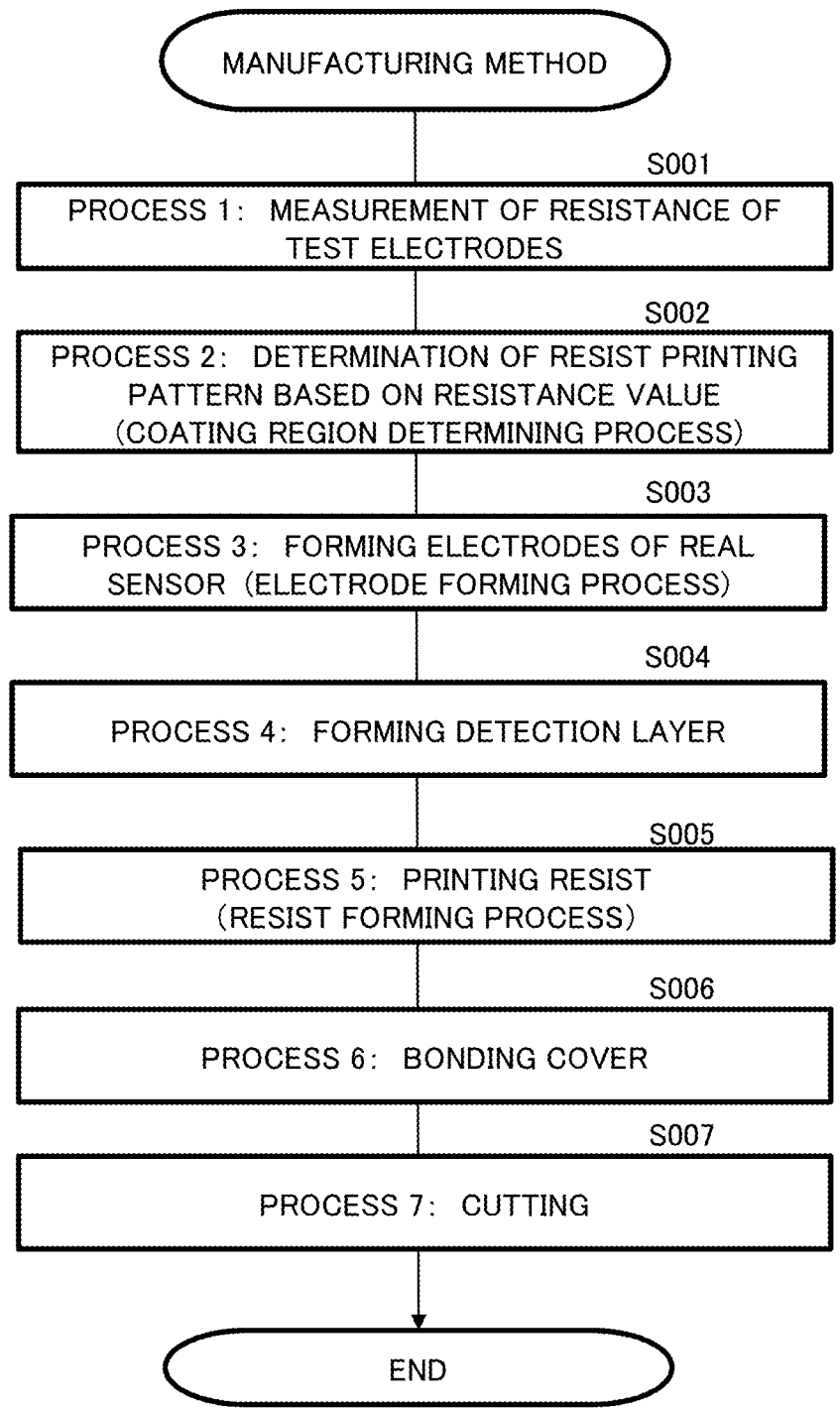
FIG. 7 is a flowchart showing a manufacturing method for an electrochemical sensor.

The electrochemical sensor 10 according to the present embodiment is fabricated as follows. FIG. 7 is a flowchart illustrating a manufacturing method for the electrochemical sensor.

Process 1: Step S001 in FIG. 7

When manufacturing an electrochemical sensor relating to a new lot, in which at least one of a printing plate and carbon ink is new, measurement of resistance value is preformed using a test sensor. That is to say, the actual measurement value of the resistance value is measured. The test sensor is a test electrochemical sensor (test sensor) on which resist has been printed by the second resist printing pattern (FIG. 5B), and is manufactured in accordance with the same materials and the same manufacturing conditions as the materials and the manufacturing conditions of the electrochemical sensor 10. The hematocrit electrode 4 (one of electrodes 4A and 4B) that the test sensor is provided with is used as a test electrode, and the resistance value thereof is measured. It is sufficient for the resistance value to be the resistance value between the position P1 of the measurement portion 4a1 and the position P2 of the other-end lead portion 4a2 of the hematocrit electrode 4 illustrated in FIG. 5B, in the same way as in the case of usage in the verification experiment, for example. Note that a test sensor with the first resist printing pattern (printing percentage 0%), or a test sensor in which the resist area percentage is reduced by a predetermined percentage from that of the second resist printing pattern, may also be used, not just the test sensor with the second resist printing pattern (printing percentage 100%).

Thus, in Process 1, the actual measurement value of the resistance value is found for the electrode 4A (or may be electrode 4B) of the hematocrit electrode 4 of the test sensor, and the resist printing pattern to be used for manufacturing actual products of the electrochemical sensor 10 is determined. Note however, that Process 1 is not an indispensable configuration, and that the resist printing pattern may be determined using other index information.

Process 2: Step S002 in FIG. 7

The resist printing pattern (coating region) to be applied to manufacturing actual products of the electrochemical sensor 10 is determined on the basis of the measured resistance value, so that the resistance value of the hematocrit electrode 4 of the electrochemical sensor 10 that is an actual product is the target resistance value (brought into the proximity of the target resistance value). In selection of the coating region, a coating region to coat the electrodes with resist is selected from a plurality of adjustment regions 50. Specifically, the number of adjustment regions in which resist is coated to form a coating region differs. For example, a table such as in Table 1 below is used. The "resistance value" in Table 1 illustrates the resistance value of the test electrode on which resist is printed in accordance with the second resist printing pattern.

TABLE 1

| Difference between resistance value and target value [Ω] | Resist printing pattern |
|---|---|
| Greater than −50, and not greater than +30 | Print resist on full face (no non-printed region) |
| Greater than +30, and not greater than +90 | Form non-printed regions 8a and 8d |
| Greater than +90, and not greater than +150 | Form non-printed regions 8a, 8b, 8d and 8e |
| Greater than +150, and not greater than +200 | Form non-printed regions 8a, 8b, 8c, 8d, 8e and 8f |
| Not less than +200, or less than −50 | Remake carbon ink |

For example, in a case where the resistance value is within a range of −50Ω to +30Ω from the target resistance value, the second resist printing pattern, i.e., the resist printing pattern (coating region) in which no non-printed region is provided at the intermediate portions (adjustment region 50) of the lead portions 4a2 and 4b2 is determined.

Also, in a case where the resistance value is higher than the target resistance value by 30Ω to 90Ω, a resist printing pattern (coating region) in which two of the non-printed regions 8a through 8f illustrated in FIG. 1B and corresponding to the adjustment region 50, non-printed regions 8a and 8d for example, are formed is determined as results for resist printing. Note however, that the combination of the non-printed regions may be other than the combination of the non-printed regions 8a and 8d, as long as two from among the non-printed regions 8a through 8f are selected. Note that the electrodes 4a and 4B form a closed circuit through the sample (liquid) in measurement of the second response, and accordingly the non-printed regions may be provided to only one of the electrodes 4A and 4B.

Also, in a case where the resistance value is higher than the target value by 90Ω to 150Ω, a resist printing pattern (coating region) in which four of the non-printed regions 8a through 8f illustrated in FIG. 1B, non-printed regions 8a, 8b, 8d, and 8e for example, are formed is determined as results for resist printing. Note however, that the combination of the non-printed regions may be other than the combination of the non-printed regions 8a, 8b, 8d, and 8e, as long as four from among the non-printed regions 8a through 8f are selected.

Also, in a case where the resistance value is higher than the target value by 150Ω to 200Ω, a resist printing pattern (coating region) in which all of the non-printed regions 8a through 8f illustrated in FIG. 1B are formed is determined as results for resist printing. Also, in a case in which the resistance value is no lower than 200Ω above the target value, or in a case in which the resistance value is no higher than 50Ω below the target value, the carbon ink is remade. The resist printing pattern defining the coating region can be set as appropriate. Process 2 is an example of the resist forming process, and is a processing of determining a coating region. The resistance value of the test electrode is an example of "index information".

Note that the numerical values and divisions shown in Table 1 are applied only to the case of the present Example, and that numerical values and divisions can be set as appropriate. Also, the resist area percentage may be set linearly in accordance with the resistance value of the test electrode, or the area may be set in stages, instead of being patterns.

Once the resist printing pattern defining the coating region is determined, actual products of the electrochemical sensor 10 are manufactured as described below.

Process 3: Step S003 in FIG. 7

Electrode patterns of a plurality of hematocrit electrodes 4 and glucose electrodes 5 are printed on an insulating substrate sheet by screen printing using carbon ink. Process 3 is an example of the electrode forming process.

Process 4: Step S004 in FIG. 7

A reagent is dribbled or coated onto the glucose electrode 5, and hardened by drying, thereby forming the detection layer 6.

Process 5: Step S005 in FIG. 7

Resist ink is printed on the electrode patterns on the insulating substrate sheet, using the resist printing pattern selected in Process 2. The coating region on the hematocrit electrode 4 is coated by resist in Process 5. Process 5 is an example of the resist forming process.

Process 6: Step S006 in FIG. 7

The cover 3 is placed on and bonded by both-sided tape.

Process 7: Step S007 in FIG. 7

The insulating substrate sheet is cut to obtain electrochemical sensor 10 pieces.

Figure 8A:
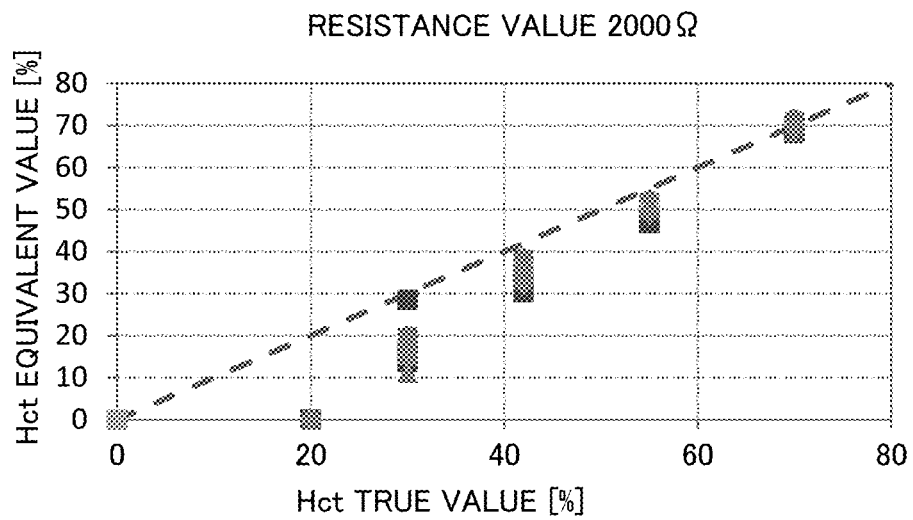
FIGS. 8A through 8C are graphs showing relation between true values of hematocrit values and resistance values.
Figure 8B:
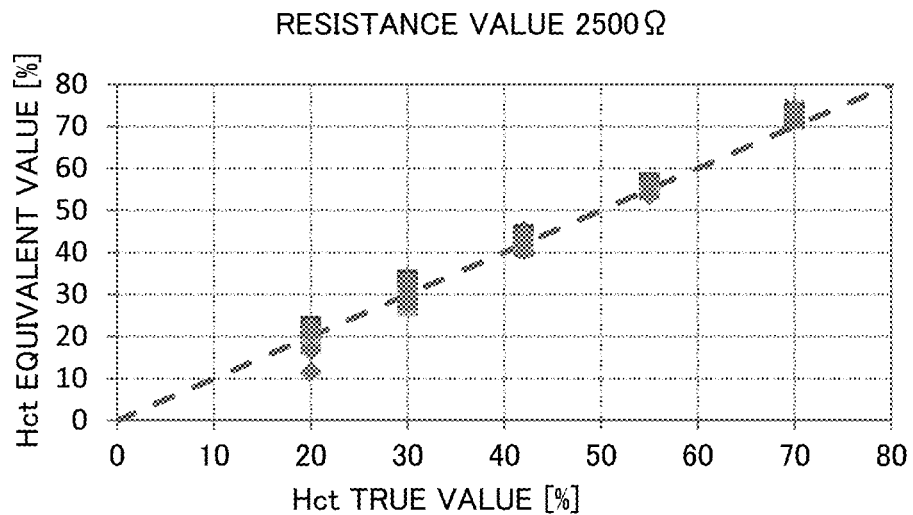
Figure 8C:
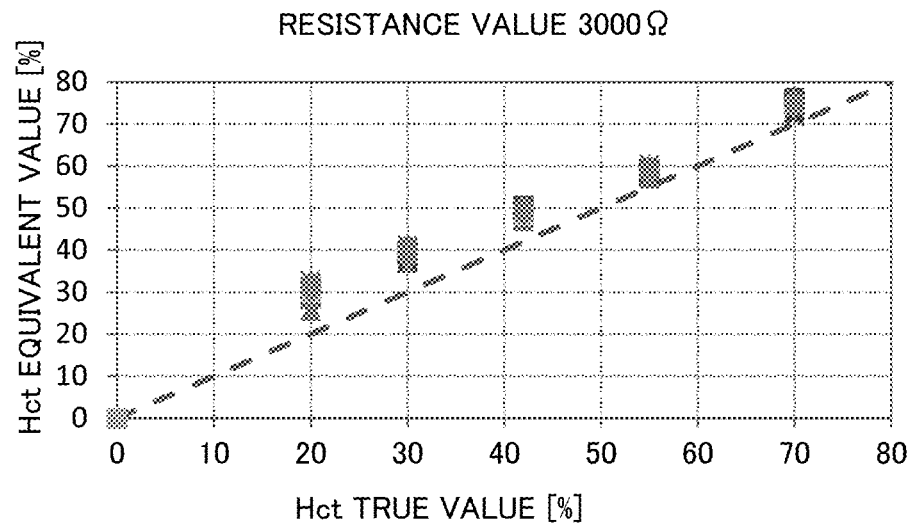

Verification Regarding Effects in Case of Deviating from Target Resistance Value The effects on measurement values in a case of the resistance value deviating from the target resistance value referred to in the above Process 2 was verified. FIGS. 8A through 8C are graphs illustrating, with regard to usage of an electrochemical sensor in which the resistance value of the hematocrit electrode 4 has been changed, the relation between post-conversion values of hematocrit values (actual measurement values) in a case of measuring an analyte (sample) set to a predetermined hematocrit value using the hematocrit electrode 4, and true values of hematocrit values. The dashed straight line in FIGS. 8A through 8C is a reference line indicating true values of hematocrit values (actual values), and the plotted points indicate converted values of hematocrit values (actual measurement values) obtained from the values of the second electrical response.

The graphs shown in FIGS. 8A through 8C were compiled as follows.

(1) A conversion table or calibration curve for appropriately converting the value of a current flowing through the electrode (second response value) into a hematocrit value in a case of the target resistance value (2500Ω in the present verification) is compiled in advance.

(2) Electrochemical sensors, of which the resistance values of the hematocrit electrodes are 2000Ω, 2500Ω, and 3000Ω, respectively, are fabricated.

(3) Analytes (samples) of which the hematocrit true values are 20%, 30%, 42%, 55%, and 70%, respectively, are introduced to the hematocrit electrodes of the electrochemical sensors.

(4) Voltage is applied to the hematocrit electrodes, and current values (second response values) flowing through the electrodes are measured.

(5) Conversion values of the hematocrit values, where the measured current values are converted into hematocrit values, are found using the conversion table or the calibration curve.

As illustrated in FIG. 8A, in a case where the resistance value of the hematocrit electrode 4 is 2000Ω, the conversion values of the hematocrit values are lower than the true values (actual hematocrit values). As illustrated in FIG. 8B, in a case where the resistance value of the hematocrit electrode 4 is 2500Ω, the hematocrit conversion values are on the straight line of true values. Accordingly, the linearity of hematocrit conversion values is maintained. As illustrated in FIG. 8C, in a case where the resistance value of the hematocrit electrode 4 is 3000Ω, the hematocrit conversion values are higher than the true values. This is due to the following principle. First, when applying a current to an analyte, the greater the amount of hematocrit, which is blood cells, is (the higher the hematocrit value is), the higher the resistance value is, and the current does not flow readily. Accordingly, the higher the hematocrit value of the analyte is, the lower the measurement value is in a case of measuring using the hematocrit electrode. Conversely, the lower the resistance value of the electrode is, the more readily current flows through the electrode, and the measured current value is higher than a case where the resistance value is the target value. Accordingly, deviation of the resistance value of the electrode causes the value of the hematocrit value to deviate from the true value. In a case in which the resistance value is low, the hematocrit conversion value is low, and conversely, in a case in which the resistance value is high, the hematocrit conversion value is high. Accordingly, in the case of the present verification, the results shown in FIGS. 8A through 8C are obtained. It can be understood from the examples shown in FIGS. 8A through 8C that a case where the target resistance value is 2500Ω is optimal for a conversion table or a calibration curve. The resist printing pattern (size of the coating region on the lead portions 4a2 and 4b2) is determined in Process 2 such that the resistance value is in the proximity of 2500Ω, which is the target resistance value.

That is to say, the conversion table or calibration curve is prepared to be able to appropriately convert the measured current values into hematocrit values in a case in which the resistance value of the hematocrit electrode 4 is the target resistance value, and accordingly it is important to manufacture the electrochemical sensor such that the resistance value of the hematocrit electrode 4 is this target resistance value.

In the manufacturing method for the electrochemical sensor 10 according to the present embodiment described above, the carbon hematocrit electrode 4 is formed on the insulating substrate 1 in the electrode forming process, as an electrode formed of a porous electroconductive material. Also, the coating region for coating over the hematocrit electrode 4 with the resist 2 of the non-electroconductive material is determined in the process of determining the coating region in the resist forming process. The determined coating region is coated by the resist 2 in a solution state in the resist forming process, and permeating the communicating pores of the porous material with resist, thereby adjusting the resistance value of the electrode. Accordingly, the resistance value of the hematocrit electrode 4 that is a carbon electrode can be changed without changing the shape or properties thereof, and accurate hematocrit value measurement can be performed. Thus, the glucose values measured using the glucose electrode 5 and corrected by the hematocrit values can also be made to be accurate values.

Also, in the manufacturing method according to the present embodiment, a plurality of resist printing patterns with different coating regions (first and second printing patterns) are prepared, and the coating region is determined by selecting a resist printing pattern to coat the hematocrit electrode 4 with, out of the plurality of resist printing patterns in the process of determining the coating region in the resist forming process. Preparing a plurality of resist printing patterns facilitates determination of the coating region.

Also, in the manufacturing method according to the present embodiment, the coating region has at least one adjustment region (plurality of non-printed regions 8), with the number of the non-printed regions 8 differing among the plurality of resist printing patterns. Also, in the manufacturing method according to the present embodiment, the area of the coating region and the resistance value of the hematocrit electrode 4 have a relation that the larger the area of the coating region is, the greater the resistance value of the electrode is. Accordingly, a resist printing pattern corresponding to the amount of increasing the resistance value of the hematocrit electrode 4 through adjustment is selected out of a plurality of resist printing patterns that have different areas of coating regions, in the process of determining the coating region in the resist forming process. Thus, the resistance value can be adjusted by selecting a resist printing pattern having the number of non-printed regions 8 corresponding to the adjustment amount of the resistance value.

In the manufacturing method according to the present embodiment, the electrode 4B (4A) has the measurement portion 4b1 (4a1) and the lead portion 4b2 (4a2) connected to the measurement portion 4b1 (4a1), with the coating region being defined on the lead portion 4b2 (4a2). This is because increase or reduction of area of the lead portion 4b2 (4a2) has smaller effects on the results of measurement using the electrochemical sensor 10 as compared to increase or reduction of area of the measurement portion 4b1 (4a1).

In the manufacturing method according to the present embodiment, the coating region is determined on the basis of index information corresponding to the resistance value of the electrode, in the process of determining the coating region in the resist forming process. Specifically, the coating region coating the hematocrit electrode 4 in the second resist printing pattern (FIG. 5B) is set to the reference coating region. The target resistance value that is a target value for the resistance value, that has been set taking hematocrit measurement into consideration, is set to the hematocrit electrode 4. The index information used for determining the coating region is information indicating a high/low level of the resistance value of the hematocrit electrode 4 as to the target resistance value. The coating region is made to be smaller than the reference coating region in a case where the resistance value of the hematocrit electrode 4 is higher than the target resistance value. The coating region is made to be larger than the reference coating region in a case where the resistance value of the hematocrit electrode 4 is lower than the target resistance value. Thus, the resistance value can be easily adjusted.

MODIFICATIONS

Description has been made in the above embodiment regarding a hematocrit electrode that measures hematocrit values, as an example of an electrode pair. Hematocrit values are an exemplification of measurement items, and the electrode pair may be used to measure items other than hematocrit. Also, while no reagent is used in the hematocrit electrode, the manufacturing method for the electrochemical sensor described in the embodiment is useful in adjusting resistance values of electrodes, and is also applicable to electrodes using reagents, such as glucose electrodes for example. Also, while a pair of electrodes has been described in the above embodiment, an arrangement may be made where two pairs of electrodes are each coated with resist to adjust the resistance values of the electrodes.

Configurations described in the above embodiment may be combined as appropriate without departing from the object of the invention.

What is claimed is:

1. A manufacturing method for an electrochemical sensor, the method comprising:
    an electrode forming step of forming an electrode, made of a porous material with electroconductivity, on an insulating substrate; and
    a resist forming step of coating a coating region on the electrode by a resist with non-electroconductivity in a solution state, and permeating communicating pores of the porous material with the resist, thereby adjusting a resistance value of the electrode,
    wherein the coating region is a region on the electrode which is determined to have variable size and shape by adjusting percentage of printing areas in the region based on index information corresponding to the resistance value of the electrode in order to adjust the resistance value of the electrode, wherein a plurality of different resist printing patterns are prepared for the coating region, and in the resist forming step, the coating region is coated by the resist according to one resist printing pattern selected from the plurality of resist printing patterns based on the index information.
2. The manufacturing method for an electrochemical sensor according to claim 1, wherein a plurality of adjustment regions are set in the region of the electrode, and the coating region includes the plurality of adjustment regions, and
    the number of the adjustment regions differs among the plurality of resist printing patterns to adjust the percentage of printing areas in the region.
3. The manufacturing method for an electrochemical sensor according to claim 1, wherein the electrode is provided with a measurement portion and a lead portion connected to the measurement portion, and the coating region is defined on the lead portion.
4. The manufacturing method for an electrochemical sensor according to claim 1, wherein
    a target resistance value that is a target value for the resistance value of the electrode, and a reference coating region that is a coating region for attaining the target resistance value are set in advance, and
    the index information indicates whether the resistance value of the electrode is higher than the target resistance value,
    in response to the index information indicating that the resistance value of the electrode is higher than the target resistance value, the coating region is made to be smaller than the reference coating region, and
    in response to the index information indicating that the resistance value of the electrode is lower than the target resistance value, the coating region is made to be larger than the reference coating region.
5. The manufacturing method for an electrochemical sensor according to claim 1, wherein the index information is information corresponding to an actual measurement value of a resistance value of an electrode of a test sensor which is formed from the same material and under the same manufacturing conditions as those of the electrode, the electrode of the test sensor having a region coated by the resist according to a printing pattern selected from among a plurality of printing patterns for the test sensor.
6. The manufacturing method for an electrochemical sensor according to claim 5, wherein a target resistance value serving as a target value for the resistance value of the electrode is set in advance, and
    the coating region, determined based on a difference between the actual measurement value of the resistance value of the electrode of the test sensor and the target resistance value, is coated by the resist in the resist forming step.
7. The manufacturing method for an electrochemical sensor according to claim 5, wherein the actual measurement value of the resistance value of the electrode of the test sensor is a resistance value in a defined section including the region coated by the resist according to the printing pattern.
8. The manufacturing method for an electrochemical sensor according to claim 1, wherein the porous electroconductive material is carbon.
9. The manufacturing method for an electrochemical sensor according to claim 1, wherein the resist contains acrylic resin.
10. The manufacturing method for an electrochemical sensor according to claim 1, wherein a reagent dissolvable in a liquid sample is not provided in the electrode.

\* \* \* \* \*